US009609625B2

United States Patent
Bleakley et al.

(10) Patent No.: US 9,609,625 B2
(45) Date of Patent: *Mar. 28, 2017

(54) MULTICHANNEL PREFERRED DEVICE NOTIFICATION

(71) Applicant: International Business Machines Corporation, Armonk, NY (US)

(72) Inventors: Darrell O. Bleakley, Raleigh, NC (US); Michael P. Etgen, Cary, NC (US); Stephen J. Kenna, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,312

(22) Filed: Aug. 24, 2016

(65) Prior Publication Data

US 2016/0360506 A1 Dec. 8, 2016

Related U.S. Application Data

(63) Continuation of application No. 15/062,564, filed on Mar. 7, 2016, now Pat. No. 9,473,905, which is a continuation of application No. 14/707,455, filed on May 8, 2015.

(51) Int. Cl.
| | |
|---|---|
| *G08B 23/00* | (2006.01) |
| *H04W 68/02* | (2009.01) |
| *H04W 4/06* | (2009.01) |
| *H04L 29/06* | (2006.01) |
| *H04L 12/58* | (2006.01) |

(52) U.S. Cl.
CPC ............. *H04W 68/02* (2013.01); *H04W 4/06* (2013.01); *H04L 51/24* (2013.01); *H04L 67/42* (2013.01)

(58) Field of Classification Search
CPC ........ H04W 68/02; H04W 4/06; H04L 51/24; H04L 67/42
USPC ......................................................... 340/500
See application file for complete search history.

(56) References Cited

U.S. PATENT DOCUMENTS

| | | | | |
|---|---|---|---|---|
| 8,352,546 | B1 * | 1/2013 | Dollard ................... | H04L 67/24 709/203 |
| 8,949,363 | B2 * | 2/2015 | Gray ....................... | H04L 51/24 709/206 |

FOREIGN PATENT DOCUMENTS

WO 2014118801 A1 8/2014

* cited by examiner

*Primary Examiner* — Kerri McNally
(74) *Attorney, Agent, or Firm* — Cantor Colburn LLP

(57) ABSTRACT

Embodiments relate to multichannel preferred device notification. A system includes a memory having computer readable instructions and a processor for executing the computer readable instructions. The computer readable instructions include receiving an electronic notification for a user and determining whether a device group including a plurality of electronic devices is defined for the user. A notification subgroup is identified that includes more than one of the electronic devices located within a predefined overlapping notification range based on determining that the device group is defined for the user. A primary device is identified from the notification subgroup based on a notification priority defined for each of the electronic devices in the notification subgroup. Generation of a notification output corresponding to the electronic notification is triggered on the primary device.

1 Claim, 4 Drawing Sheets

MULTICHANNEL PREFERRED DEVICE NOTIFICATION

PRIORITY

This application is a Continuation of legally related U.S. application Ser. No. 15/062,564 filed Jun. 29, 2016, which is a Continuation of U.S. patent application Ser. No. 14/707,455, filed on May 8, 2015, the entire contents of which are incorporated herein by reference.

BACKGROUND

The present disclosure relates to device notification and, more specifically, to multichannel preferred device notification.

Users of electronic devices often have multiple devices available at different times throughout the day. For example, a user may have a mobile device, a tablet computer, and a personal computer in close proximity to each other. One or more of these devices may be capable of receiving electronic notifications and in turn, generating notification responses to the user, such as an auditory indicator, a visual indicator, or vibration. Notifications can be generated based on a variety of events, such as a text message, e-mail, voice/video call, voice message, application update, or other events. The notifications can be useful, particularly where a rapid response is needed. However, it can be disruptive to be notified simultaneously on multiple devices for the same event.

SUMMARY

According to an embodiment, a system for multichannel preferred device notification is provided. The system includes a memory having computer readable instructions and a processor for executing the computer readable instructions. The computer readable instructions include receiving an electronic notification for a user and determining whether a device group including a plurality of electronic devices is defined for the user. A notification subgroup is identified that includes more than one of the electronic devices located within a predefined overlapping notification range based on determining that the device group is defined for the user. A primary device is identified from the notification subgroup based on a notification priority defined for each of the electronic devices in the notification subgroup. Generation of a notification output corresponding to the electronic notification is triggered on the primary device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
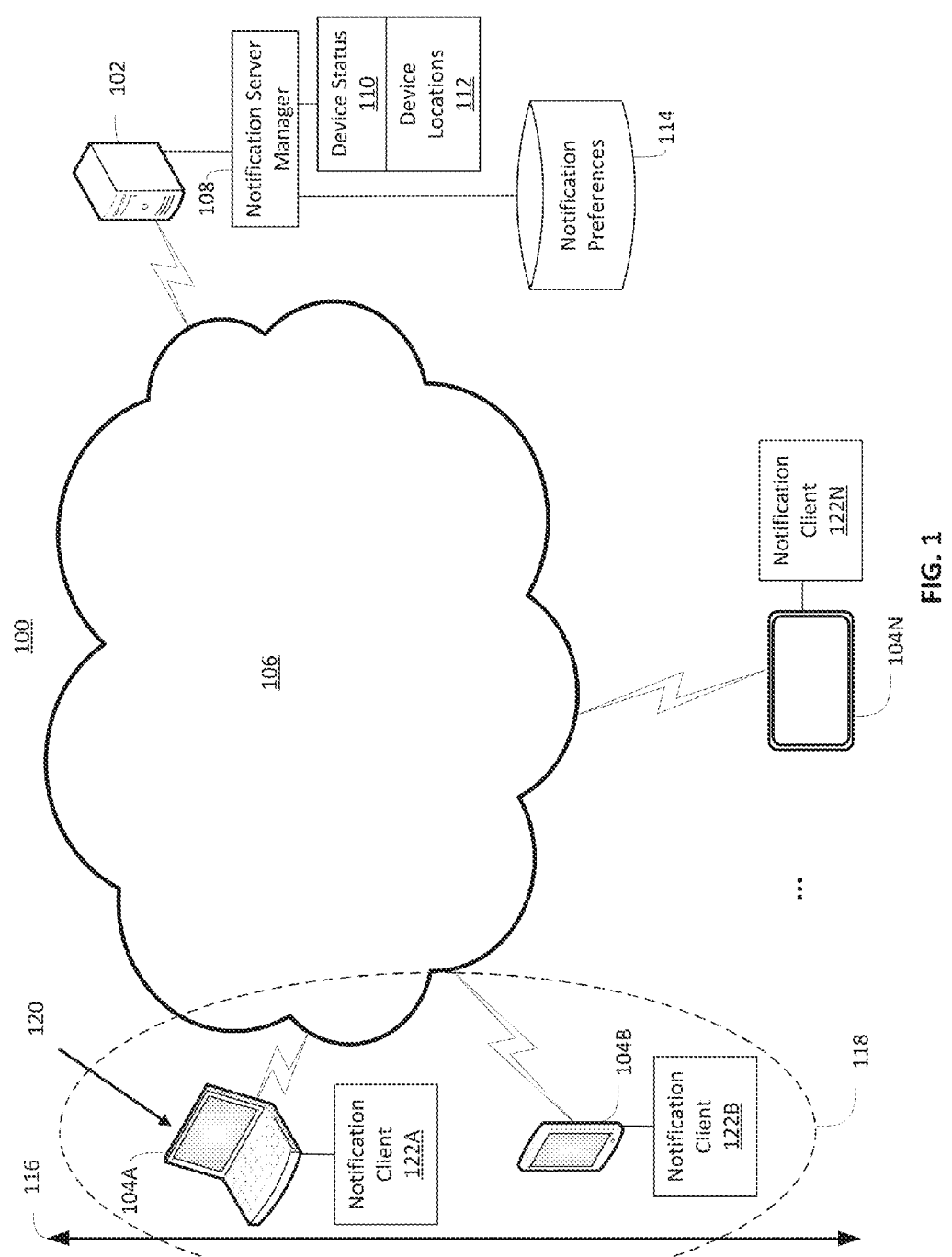
FIG. 1 depicts a block diagram of a system upon which multichannel preferred device notification may be implemented according to an embodiment.

Exemplary embodiments relate to multichannel preferred device notification. Generation of a notification output from an electronic device can be limited based on proximity to other electronic devices also capable of generating the notification output, and may be further limited based on time of day and/or location. Turning now to FIG. 1, an example of a system 100 upon which multichannel preferred device notification may be implemented will now be described in greater detail. The system 100 represents a networked environment, such as the Internet, where messages, files, events, audio streams, video streams, and the like can be transmitted between one or more server and electronic devices.

In the example depicted in FIG. 1, the system 100 includes a notification server 102 configured to communicate with one or more electronic devices 104A-N over a network 106. The network 106 may be any type of communications network known in the art and can include a combination of wireless, wired, and/or fiber optic links. Although only one notification server 102 is depicted in FIG. 1, it will be understood that there can be multiple notification servers 102 which can interface with other networked components and electronic devices 104A-N across the network 106 over a geographically wide area.

In exemplary embodiments, the notification server 102 is implemented on a high-speed processing device (e.g., a mainframe computer, an embedded computing device, or the like) including at least one processing circuit (e.g., a computer processor/CPU) capable of reading and executing instructions, and handling interactions with various components of the system 100. Alternatively, the notification server 102 can be embodied entirely in hardware including circuits and memory to perform processes as described herein. In the example of FIG. 1, the notification server 102 includes a notification server manager 108 configured to track device status 110, device locations 112, and notification preferences 114 for one or more users of the electronic devices 104A-N. The notification server manager 108 may be an application executable on the notification server 102. The device status 110 and device locations 112 can be stored in volatile memory of the notification server 102 for rapid updating as the electronic devices 104A-N change in geographic location and change between an active and sleeping status. The device status 110 holds activation status, e.g., active/sleeping, for one or more of the electronic devices 104A-N. The device locations 112 hold location indicators defining a location of one or more of the electronic devices 104A-N.

The notification preferences 114 may be stored in non-volatile memory to define device groups, a predefined overlapping notification range, and one or more notification priority based on user preferences. For example, a user may have accounts for electronic device 104A, 104B, and 104N which form a device group, but the devices may not always be powered-on or configured for active use at the same time. In the example of FIG. 1, electronic devices 104A and 104B are within a predefined overlapping notification range 116 and form a notification subgroup 118. Electronic device 104N may either be outside of the predefined overlapping notification range 116 or have an activation status of sleeping or depowered. The predefined overlapping notification range 116 may define a distance or area in which redundant notification outputs by multiple electronic devices 104A-104N is not desired. The notification preferences 114 can define an order of the notification priority under general conditions and/or under specific conditions. For example, a default order of notification priority may be to identify electronic device 104A as a primary device 120 if active; otherwise identify electronic device 104B as the primary device 120 if active; and otherwise, identify electronic device 104N as the primary device 120 if active. Thus, in the example of FIG. 1, upon receiving an electronic notification (e.g., a short message service (SMS) notification), the notification server manager 108 would trigger generation of a notification output corresponding to the electronic notification on electronic device 104A as the primary device 120 without triggering an auditory or vibration notification on electronic device 104B.

Multiple ordered lists can be stored in the notification preferences 114 for a variety of scenarios that change the order of notification priority based on factors such as a geographic location of the electronic devices 104A-N and/or a time of day. A global positioning system interface of electronic device 104B can indicate a geographic location of the electronic device 104B that can be used to determine an environment type. For example, the notification preferences 114 can define particular locations as "work", "home", "commuting route", and other such designations. The notification preferences 114 may interface with an interactive map application (not depicted) and/or allow the user to tag a current location of one of the electronic devices 104A-N as a particular environment type. When a location indicator of an electronic device 104A-N matches an identified designation, the order of notification priority may change, e.g., primary device 120 is an office desktop computer at work, a mobile device (e.g., a smartphone) along commuting route, and a tablet computer at home. Time of day may also or alternatively be another factor that changes an order of notification priority. For instance, at home a tablet computer may be the primary device 120 from 8 PM-11 PM, all notifications muted from 11 PM-6 AM, and a mobile device preferred between 6 AM-7 AM.

Other examples of conditions that can define notification priority to trigger generation of a notification output include: notification type, notification topic, and/or notification source that can be defined in the notification preferences 114. For example, if a notification type is an SMS message, the primary device 120 can default to a mobile phone, while an e-mail notification can be set to default to a laptop computer. Data within an electronic notification may be analyzed to identify a notification topic. For instance, an electronic notification about a family event may be prioritized to prefer a personal mobile device, while an electronic notification about a business event may be prioritized to prefer a business mobile device. As a further example, where a notification source is defined for notification priority, an electronic notification from a news service may be prioritized for a tablet computer, while an electronic notification from an employer's computer network (e.g., defined based on domain name or IP address) may be prioritized for notification at an employee's work computer (e.g., a predefined desktop or laptop computer).

Where multiple preference categories are defined, a weighting or priority list for applying the rules can be established in the notification preferences 114. For example, preferences can be ordered for evaluation as assigning a greater weight to notification type, location, and time of day notification preferences, with less weight given to notification topic, and/or notification source. It will be understood that any combination of preferences to establish notification priority can be defined in the notification preferences 114, including fewer preferences or additional preferences beyond the examples provided herein.

In embodiments, notification priorities in the notification preferences 114 can be defined on a user or group basis, such that notification priorities can be shared between multiple users or customized on a per-user basis. Each user or group administrator can define and adjust notification policies depending upon security permissions defined for modifying the notification preferences 114. Thus, even though the notification preferences 114 are depicted as a single entity in FIG. 1, the notification preferences 114 can be further subdivided and/or distributed over multiple storage locations and with access controls.

In exemplary embodiments, the electronic devices 104A-N can include a variety of computing devices with processing circuits and I/O interfaces, such as a keys/buttons, a touchscreen, audio input, a display device and audio output. The electronic devices 104A-N may be embodied in any type of computing device known in the art, such as a laptop, tablet computer, mobile device, personal computer, workstation, server, and the like. Accordingly, the electronic devices 104A-N can include various computer/communication hardware and software technology known in the art, such as one or more processing units or circuits, volatile and non-volatile memory including removable media, power supplies, network interfaces, support circuitry, operating systems, and the like. Each of the electronic devices 104A-N can have a corresponding notification client 122A-N that interfaces with the notification server manager 108 and/or with other notification clients 122A-N. The notification clients 122A-N can transmit location information (if known) and activation status. When one of the notification clients 122A-N receives a notification output request and determines that it is executing on the primary device 120, an auditory, visual, and/or vibration output corresponding to the electronic notification is generated to seek attention from the user.

Figure 2:
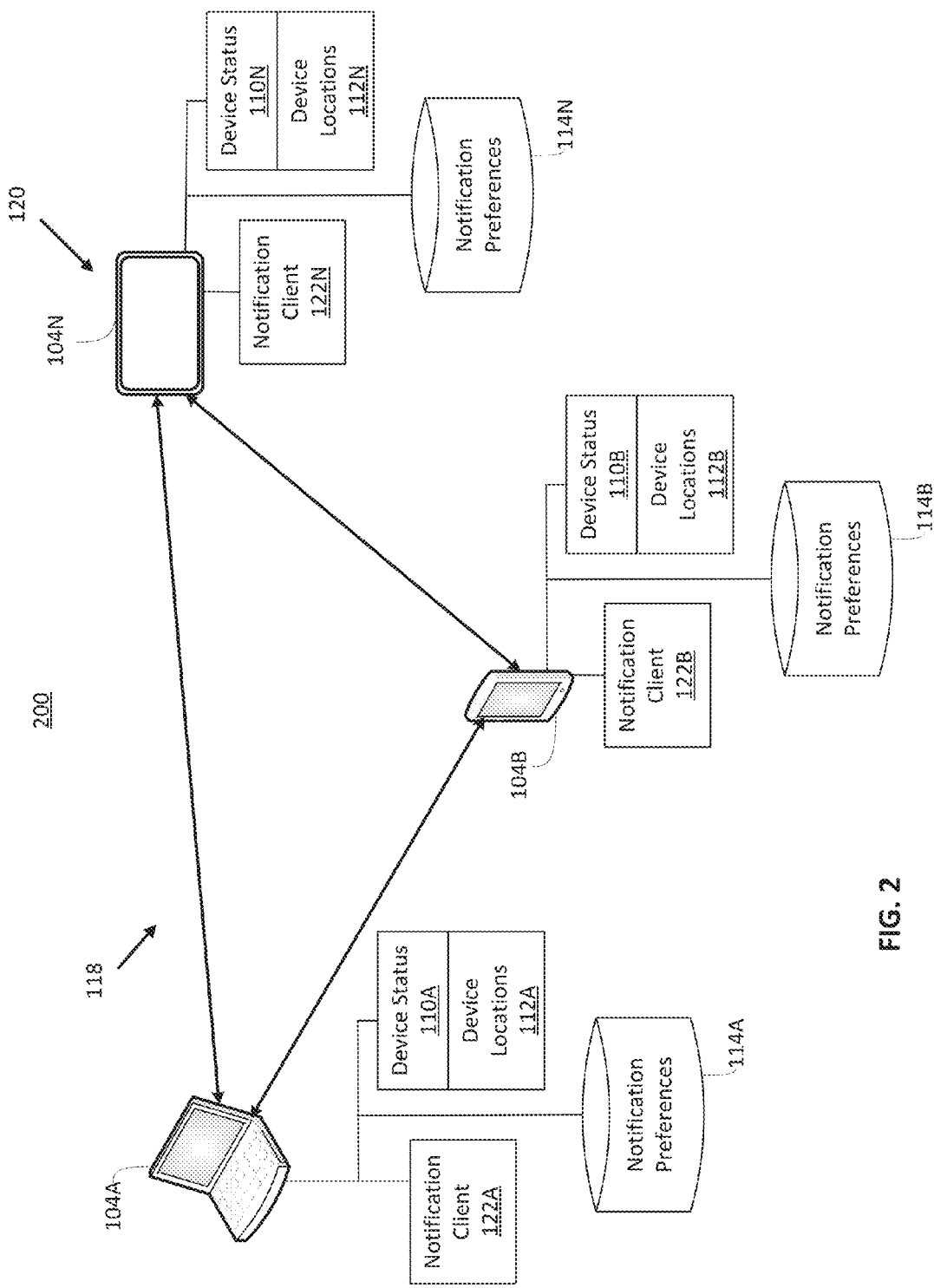
FIG. 2 depicts another example of a block diagram of a system upon which multichannel preferred device notification may be implemented according to an embodiment.

FIG. 2 depicts another example of a block diagram of a system 200 upon which multichannel preferred device notification may be implemented according to an embodiment. In the example of FIG. 2, communication and determination of the primary device 120 is determined between the electronic devices 104A-N. The notification clients 122A-N executing on the electronic devices 104A-N can establish point-to-point communication to discover active members of the notification subgroup 118. For instance, Bluetooth, Wi-Fi, near-field communication, and the like can be used to check for neighboring electronic devices 104A-N that are configured for the user, as well as location information and activation status. Effective range limits of the local communication interface may be used to define the predefined overlapping notification range 116 of FIG. 1, where electronic devices 104A-N capable of establishing local communication are considered to be in-range. Local copies of the device status 110A-N, device locations 112A-N, and/or notification preferences 114A-N can be stored locally on one or more of the electronic devices 104A-N enable any of the electronic devices 104A-N to dynamically determine and adjust membership in the notification subgroup 118 and determine the primary device 120 as the electronic devices 104A-N are physically relocated and/or change activation status from active to sleeping or depowered.

Figure 3:
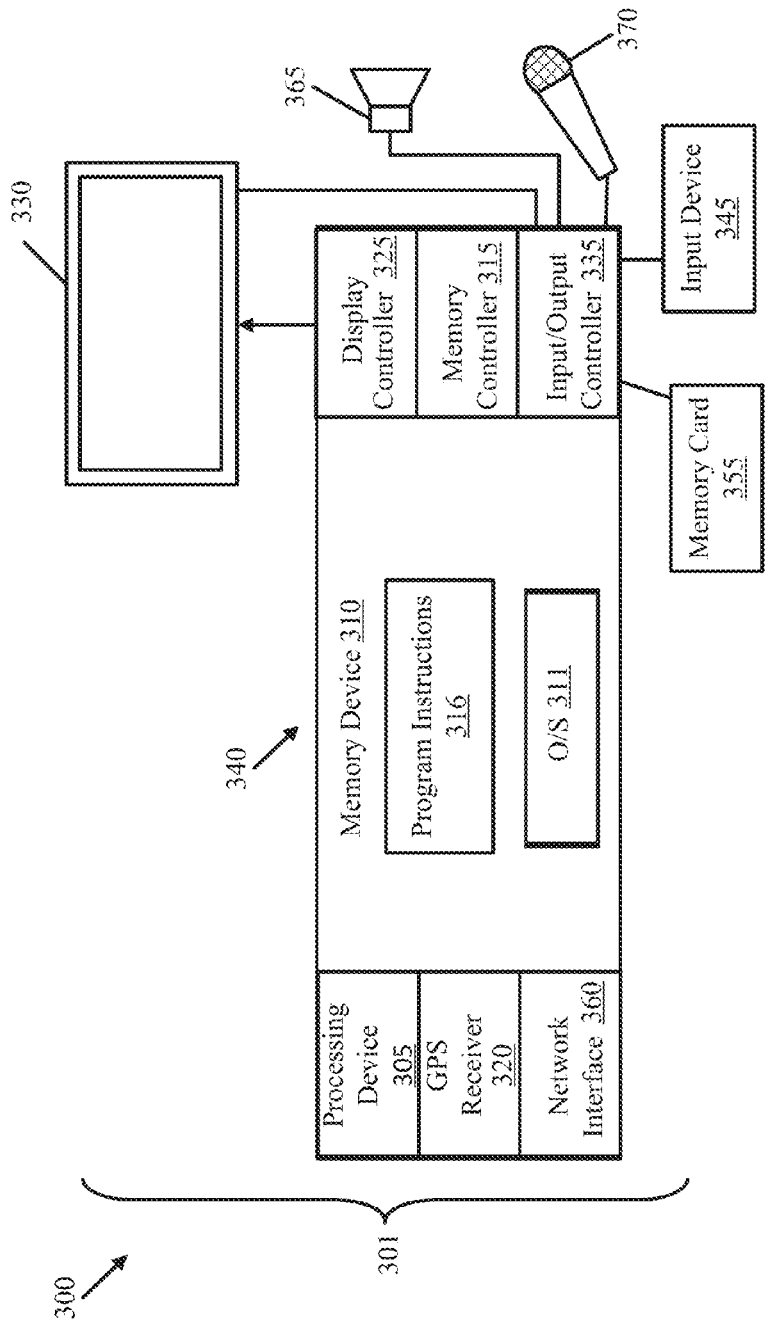
FIG. 3 depicts a further example of a block diagram of a system upon which multichannel preferred device notification may be implemented according to an embodiment.

FIG. 3 depicts a block diagram of a system 300 according to an embodiment. The system 300 is depicted embodied in electronic device 301 in FIG. 3 as an example one of the electronic devices 104A-N of FIGS. 1 and 2. It will be understood that similar features can be included in the notification server 102 of FIG. 1.

In an exemplary embodiment, in terms of hardware architecture, as shown in FIG. 3, the electronic device 301 includes a processing device 305 and a memory device 310 coupled to a memory controller 315 and an input/output controller 335. The input/output controller 335 can be, for example, but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the electronic device 301 may include address, control, and/or data connections to enable appropriate communications among the aforementioned components.

In some embodiments, a touch-sensitive display 330 or similar device can be coupled to the input/output controller 335. Alternatively, input may be received via a keypad, keyboard, or motion sensitive interface, depicted as input device 345. Extended storage capacity may be supported using a memory card 355 interfaced to the input/output controller 335. The input/output controller 335 may also be coupled to one or more speaker 365 and/or microphone 370 to support customized notification recording and playback. In an embodiment, the electronic device 301 can support VoIP, cellular transmissions, or other communication protocols known in the art. The electronic device 301 can further include a display controller 325 coupled to the touch-sensitive display 330. In an alternate embodiment, a standard video display is provided in place of the touch-sensitive display 330 and other input devices 345, such as a keyboard and touchpad, are used to provide input to the electronic device 301.

The processing device 305 is a hardware device for executing software, particularly software stored in memory device 310. The processing device 305 can be any custom made or commercially available computer processor, a central processing unit (CPU), an auxiliary processor among several processors associated with the electronic device 301, a semiconductor-based microprocessor (in the form of a microchip or chip set), a macro-processor, or generally any device for executing instructions.

The memory device 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 310 may incorporate electronic, magnetic, optical, and/or other types of storage media. Accordingly, the memory device 310 is an example of a tangible computer readable storage medium 340 upon which instructions executable by the processing device 305 may be embodied as a computer program product. The memory device 310 can have a distributed architecture, where various components are situated remote from one another, but can be accessed by the processing device 305.

The instructions in memory device 310 may include one or more separate programs, each of which comprises an ordered listing of executable instructions for implementing logical functions. In the example of FIG. 3, the instructions in the memory device 310 include a suitable operating system (OS) 311 and program instructions 316. The operating system 311 essentially controls the execution of other computer programs and provides scheduling, input-output control, file and data management, memory management, and communication control and related services. When the electronic device 301 is in operation, the processing device 305 is configured to execute instructions stored within the memory device 310, to communicate data to and from the memory device 310, and to generally control operations of the electronic device 301 pursuant to the instructions. Examples of program instructions 316 can include instructions to implement the notification server manager 108 or the notification client 122A-N of FIGS. 1 and 2.

The electronic device 301 may also include a global position system (GPS) receiver 320. The GPS receiver 320 may be used to identify a current location of the electronic device 301. An internal clock (not depicted) can also provide time of day information.

The electronic device 301 also includes a network interface 360 that can establish communication channels with one or more other computer systems via one or more network links. The network interface 360 can support wired and/or wireless communication protocols known in the art. For example, when embodied in the electronic device 104A-N of FIG. 1, the network interface 360 can establish communication channels with the notification server 102 of FIG. 1 and/or other instances of the electronic device 104A-N. The network interface 360 may also support one or more other types of networks, such as a cellular network and/or satellite communication.

Figure 4:
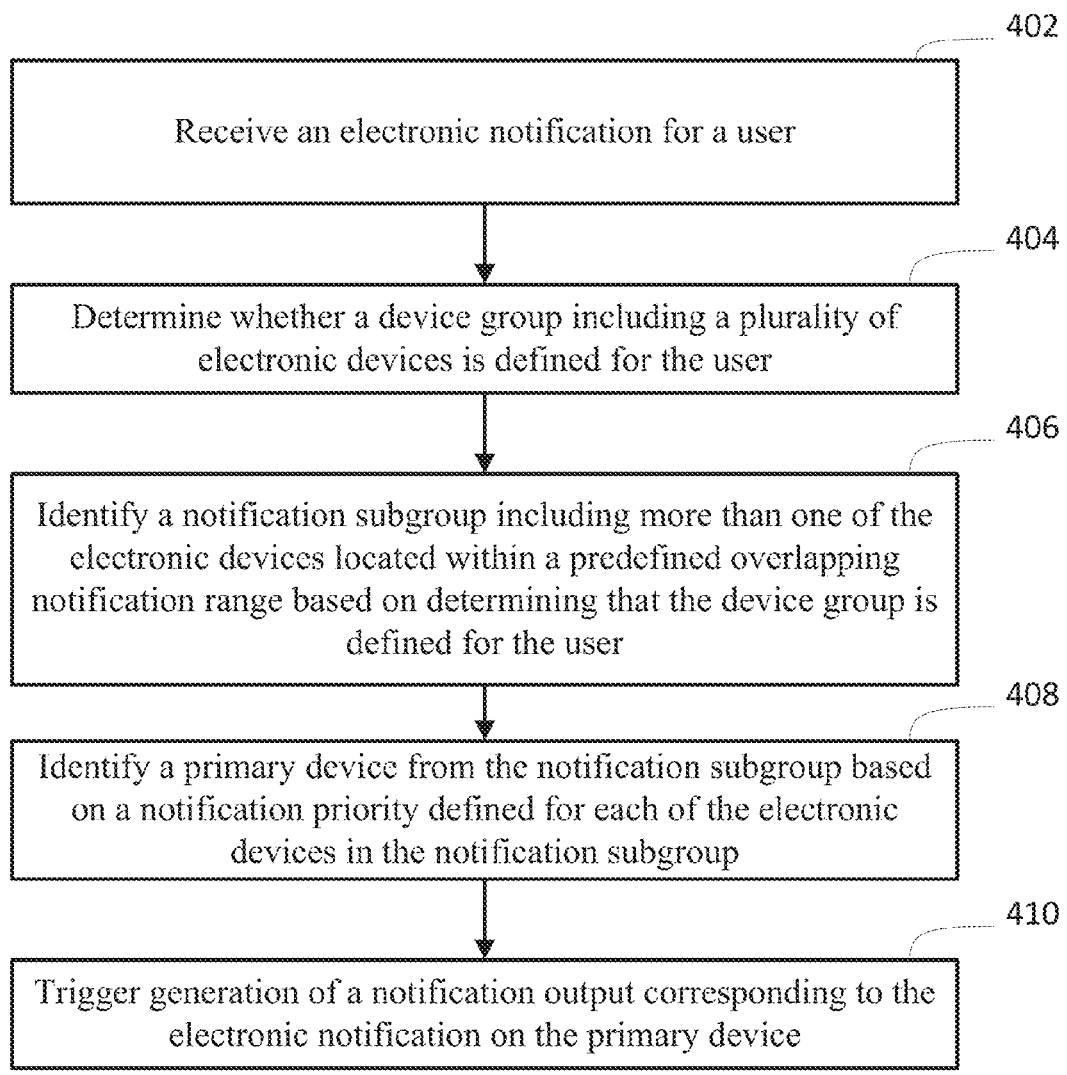
FIG. 4 depicts a flow diagram of a process for multichannel preferred device notification according to an embodiment.

Turning now to FIG. 4, a process 400 for preview serving will be described in accordance with an exemplary embodiment. The process 400 is described in reference to FIGS. 1-4 and can be implemented by the notification server 102, one or more of the electronic devices 104A-N, and/or system 300 of FIGS. 1-3. When embodied in the electronic device 301 of FIG. 3, processing device 305 can be configured to perform the process 400.

At block 402, an electronic notification is received for a user. At block 404, the notification server manager 108 or a notification client 122A-N determines whether a device group that includes multiple electronic devices 104A-N is defined for the user.

At block 406, a notification subgroup 118 is identified including more than one of the electronic devices 104A-N located within a predefined overlapping notification range 116 based on determining that the device group is defined for the user. For example, a device group can include all of the electronic devices 104A-N associated with the user, while the notification subgroup 118 may be subset of the device group based on location, proximity, and activation status. A location indicator and an activation status of the electronic devices 104A-N can be collected in the device group. The location indicator and activation status of each of the electronic devices 104A-N can be determined by periodic polling, and/or may be provided on demand in response to a request. The notification subgroup 118 may be filtered to remove any of the electronic devices 104A-N having a sleeping status.

At block 408, a primary device 120 is identified from the notification subgroup 118 based on a notification priority defined for each of the electronic devices 104A-N in the notification subgroup 118. An identifier of the primary device 120 and a membership list of the notification subgroup 118 can be shared with the electronic devices 104A-N of the notification subgroup 118. Identification of the primary device 120 may be coordinated through the notification server 102 by having the notification server manager 108 perform the determination or relay information to other electronic devices 104A-N. The notification priority defining which one of multiple electronic devices 104A-N should be set as the primary device 120 can change based on location and/or time of day. An environment type (e.g., home, school, work, etc.) can be determined based on the locations of the electronic devices 104A-N in the notification subgroup 118. The notification priority can be determined based on the environment type, where an order of the notification priority varies based on the environment type, e.g., make electronic device 104B the primary device 120 if electronic device 104A is outside of the predefined overlapping notification range 116 or sleeping. The notification priority can also or alternatively be determined based on the time of day, where an order of the notification priority varies based on the time of day, e.g., early morning, midday, evening, overnight, etc.

At block 410, generation of a notification output corresponding to the electronic notification is triggered on the primary device 120. The notification output may be an auditory, visual, and/or vibration output on the primary device 120. The notification output may not be triggered or can be muted on other electronic devices 104A-N in the notification subgroup 118 that are not designated as the primary device 120. Other electronic devices 104A-N that are not part of any notification subgroup 118 may also receive the electronic notification and trigger a notification output.

Technical effects include selectively triggering notification outputs in response to an electronic notification to a single electronic device in a group of electronic devices in close physical proximity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for multichannel preferred device notification, the system comprising:
    a memory having computer readable instructions; and
    a processor for executing the computer readable instructions, the computer readable instructions including:
    receiving an electronic notification for a user;
    determining whether a device group comprising a plurality of electronic devices is defined for the user;
    identifying a notification subgroup comprising more than one of the electronic devices located within a predefined overlapping notification range based on determining that the device group is defined for the user;
    transmitting a location and activation status request to one or more of the electronic devices based on receiving the electronic notification for the user;
    collecting a location indicator and an activation status of the electronic devices in the device group;
    filtering the notification subgroup to remove any of the electronic devices having a sleeping status;
    identifying a primary device from the notification subgroup based on a notification priority defined for each of the electronic devices in the notification subgroup;
    sharing an identifier of the primary device and a membership list of the notification subgroup to the electronic devices of the notification subgroup;
    triggering generation of a notification output corresponding to the electronic notification on the primary device; and
    coordinating a reassignment of one of the electronic devices as the primary device through a notification server having a notification manager, the reassignment based on a change in location of one or more of the electronic devices and a time of day.

* * * * *